(12) United States Patent
Snaper et al.

(10) Patent No.: US 10,862,100 B2
(45) Date of Patent: *Dec. 8, 2020

(54) RETICULATED ELECTRODE STRUCTURE AND METHOD OF MAKING THE SAME

(71) Applicants: Alvin Snaper, Las Vegas, NV (US); Jonathan Jan, Culver City, CA (US)

(72) Inventors: Alvin Snaper, Las Vegas, NV (US); Jonathan Jan, Culver City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/103,075

(22) Filed: Aug. 14, 2018

(65) Prior Publication Data

US 2018/0358607 A1 Dec. 13, 2018

Related U.S. Application Data

(63) Continuation of application No. 15/197,561, filed on Jun. 29, 2016, now Pat. No. 10,079,382.

(51) Int. Cl.

| | |
|---|---|
| *H01M 4/04* | (2006.01) |
| *C25D 3/22* | (2006.01) |
| *C25D 3/38* | (2006.01) |
| *C25D 3/44* | (2006.01) |
| *C25D 3/46* | (2006.01) |
| *C25D 3/48* | (2006.01) |
| *C25D 5/20* | (2006.01) |
| *C25D 5/50* | (2006.01) |
| *C25D 5/54* | (2006.01) |
| *C23C 18/31* | (2006.01) |

(Continued)

(52) U.S. Cl.
CPC ....... *H01M 4/0404* (2013.01); *C23C 18/1648* (2013.01); *C23C 18/31* (2013.01); *C25D 1/08* (2013.01); *C25D 3/22* (2013.01); *C25D 3/38* (2013.01); *C25D 3/44* (2013.01); *C25D 3/46* (2013.01); *C25D 3/48* (2013.01); *C25D 5/20* (2013.01); *C25D 5/50* (2013.01); *C25D 5/54* (2013.01); *H01M 4/04* (2013.01); *H01M 4/0452* (2013.01); *H01M 4/0471* (2013.01); *H01M 4/663* (2013.01); *H01M 4/667* (2013.01); *H01M 4/80* (2013.01); *H01M 2004/021* (2013.01)

(58) Field of Classification Search
CPC ............ H01M 4/0404; H01M 4/0452; H01M 4/0471; H01M 4/04; C23C 18/31; C25D 5/20; C25D 3/22; C25D 3/38; C25D 3/44; C25D 3/46

See application file for complete search history.

(56) References Cited

U.S. PATENT DOCUMENTS

| | | | | |
|---|---|---|---|---|
| 4,009,093 A | * | 2/1977 | Luch .................. | C25D 5/54 204/291 |
| 6,383,687 B1 | * | 5/2002 | Gibbons ............ | B29C 44/5654 429/233 |

(Continued)

FOREIGN PATENT DOCUMENTS

KR 20120013559 A * 2/2012

*Primary Examiner* — Binh X Tran
(74) *Attorney, Agent, or Firm* — Weiss & Moy, P.C.; Jeffrey D. Moy

(57) ABSTRACT

A method of forming an electrode in an electrochemical battery comprises: coating a reticulated substrate with a conductive material; curing the reticulated substrate coated with the conductive material; and electroplating the reticulated substrate coated with the conductive material with a desired metal material.

7 Claims, 5 Drawing Sheets

(51) Int. Cl.
*H01M 4/66* (2006.01)
*H01M 4/80* (2006.01)
*C23C 18/16* (2006.01)
*C25D 1/08* (2006.01)
*H01M 4/02* (2006.01)

(56) References Cited

U.S. PATENT DOCUMENTS

| | | | |
|---|---|---|---|
| 10,079,382 B2* | 9/2018 | Snaper | C23C 18/1648 |
| 2003/0067098 A1* | 4/2003 | Newell | B33Y 40/00 |
| | | | 264/442 |
| 2006/0034722 A1* | 2/2006 | Hsueh | B01J 35/04 |
| | | | 419/2 |
| 2011/0114496 A1* | 5/2011 | Dopp | H01M 4/8631 |
| | | | 205/109 |
| 2012/0021294 A1* | 1/2012 | Zhamu | H01B 1/122 |
| | | | 429/231.8 |
| 2014/0287641 A1* | 9/2014 | Steiner, III | B32B 5/26 |
| | | | 442/223 |
| 2014/0329126 A1* | 11/2014 | Ho | H01M 4/13 |
| | | | 429/128 |
| 2016/0281250 A1* | 9/2016 | Dhananjeyan | C25D 1/08 |
| 2016/0314868 A1* | 10/2016 | El-Zahab | H01B 1/22 |

* cited by examiner

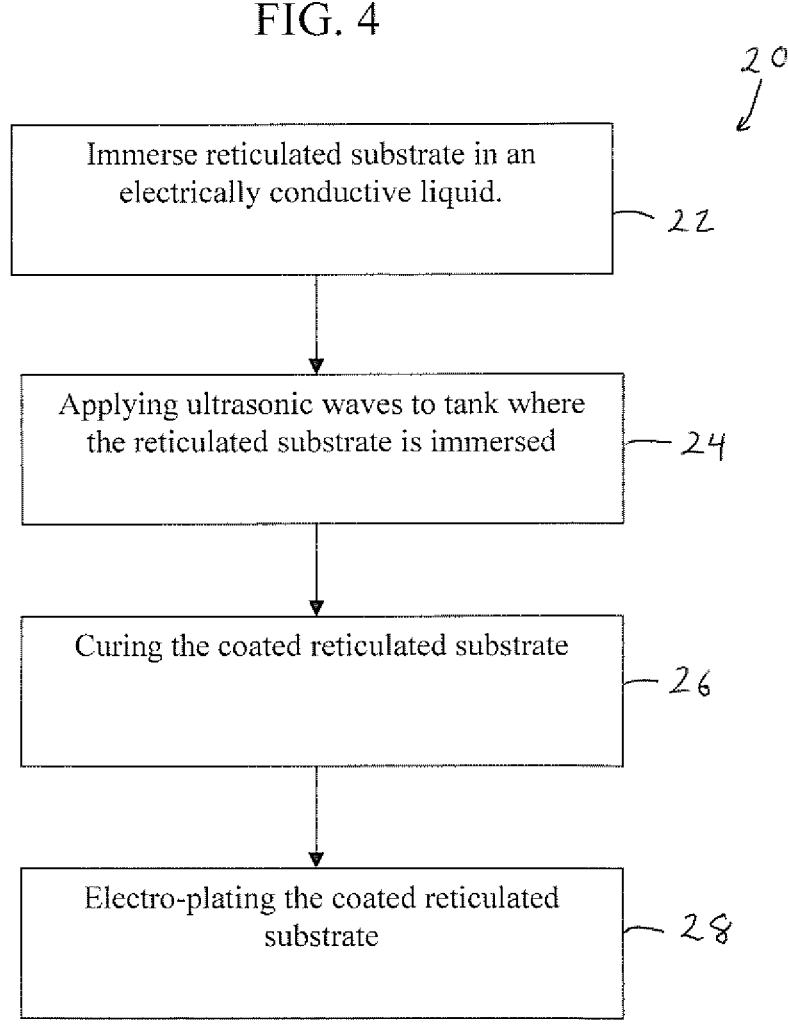

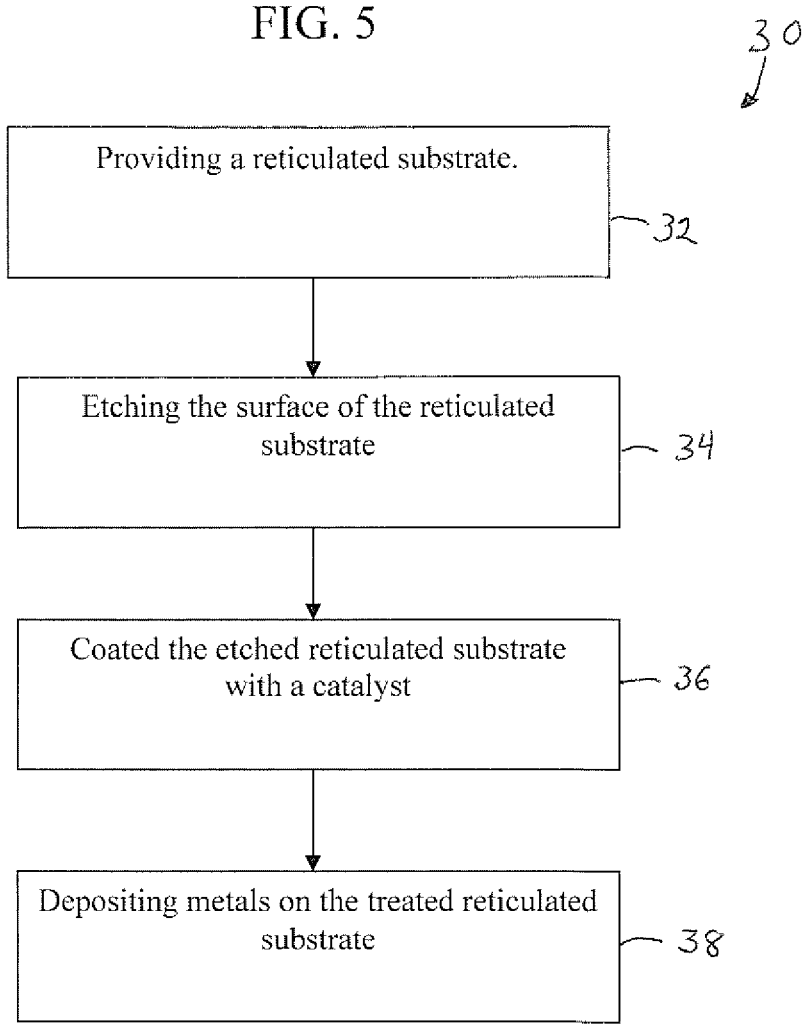

RETICULATED ELECTRODE STRUCTURE AND METHOD OF MAKING THE SAME

TECHNICAL FIELD

The present application generally relates to an electrochemical battery, and more specifically, to a method of forming a reticulated electrode structure for an electrochemical battery that increases the reacting surface area thereby increasing the capacity and efficiency of the electrochemical battery, while reducing the weight and unusable metals of the battery.

BACKGROUND

Electrochemical batteries generally include pairs of oppositely charged plates (positive and negative), and an intervening electrolyte to convey ions from one plate to the other when the circuit through the battery is completed. The ability of the electrochemical battery to deliver electrical current is generally a straight-line function of the surface area of the plates which is contacted by the electrolyte. A flat plate constitutes a lower limit, which is frequently improved by sculpting the surface of the plate. For example, waffle shapes are known to have been used. However, there is a physical limitation to what can be done to "open-up" the surface of the plates, because the plates must resist substantial mechanical stringencies such as vibration and acceleration, and must be strongly supported at their edges. Thus, plates which are rendered delicate by casting or molding them into shapes which have thin sections are not a viable solution to increase the surface area of the plates. Further, such plates are subject to erosion and loss of material, thereby further reducing the strength of the plate over the life of the battery. A tempting solution is to use a woven screen for a plate. However, screens can be bent, usually on two axes. Especially after significant erosion they do not have sufficient structural strength. A battery is destroyed if a screen or plate collapses or contacts a neighboring screen/plate.

Despite the inherent potential structural disadvantages, it is a valid objective to attempt to increase the area exposed to the electrolyte by giving access to interior regions of a plate in order to increase the capacity and efficiency of the electrochemical battery. Otherwise the entire interior of the plate serves as no more than an electrical conductor and support for the surface of the plate. Holes through the plate can in fact increase surface area by the difference between their area removed from the surface and the added area of their walls. However, there is an obvious limitation to this approach.

A benefit in addition to increased surface area which could be obtained with an open-structured plate is the storage of electrolyte within the envelope of the plate. In turn, for a given amount of electrolyte volume, the gross volume of the battery can be reduced by the amount which is stored in the plates, rather than in the spacing between plates. Evidently the problem is one of increasing the surface area of the plates without compromising their strength.

Snaper, in U.S. Pat. No. 6,060,198 describes reticulated metal structures as plates for used as electrodes in the electrochemical battery. The reticulated structure consists of a plurality of pentagonally faced dodecahedrons. The reticulated metal structure is able to increase the capacity and efficiency of electrochemical batteries, while reducing the weight and unusable metals of the battery. However, the cost of making such metal forms may be cost prohibitive for commercial production. Further, depositing metals on the reticulated polymer substrate is difficult. Vacuum plating, plasma deposition and other methods may only deposit thick coats of metal on the bearing surface. Thus, the metal may not be able to penetrate deep into the core of the substrate, thereby limiting the reacting surface area within the core of the substrate.

Therefore, it would be desirable to provide a system and method that overcomes the above. The system and method would allow the surface area throughout the substrate to be uniformly coated with conductive material.

SUMMARY

In accordance with one embodiment, a method of forming an electrode in an electrochemical battery is disclosed. The method comprises: coating a reticulated substrate with a conductive material; curing the reticulated substrate coated with the conductive material; and electroplating the reticulated substrate coated with the conductive material with a desired metal material.

In accordance with one embodiment, a method of forming an electrode in an electrochemical battery is disclosed. The method comprises: immersing a reticulated substrate in an ultrasonic tank containing a water-soluble conductive ink having conductive carbon materials; applying ultrasonic wave to break down a surface tension at the boundary layer of the reticulated substrate to promote adhesion of the conductive material; curing the reticulated substrate coated with the conductive carbon materials; and electroplating the reticulated substrate coated with the conductive carbon material with a desired metal material.

In accordance with one embodiment, a method of forming an electrode in an electrochemical battery is disclosed. The method comprises: etching a surface of a non-conductive substrate, coating the surface of the non-conductive substrate with a catalyst to aid in a deposition process; and depositing metals are onto the coated non-conductive substrate.

BRIEF DESCRIPTION OF THE DRAWINGS

The present application is further detailed with respect to the following drawings. These figures are not intended to limit the scope of the present application but rather illustrate certain attributes thereof. The same reference numbers will be used throughout the drawings to refer to the same or like parts.

FIG. 4 is a flowchart showing a method of forming the electrode, in accordance with an embodiment of the present invention; and FIG. 5 is a flowchart showing a method of forming the electrode, in accordance with an embodiment of the present invention.

DESCRIPTION OF THE APPLCIATION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Embodiments of the exemplary system and method disclose a reticulated electrode structure for use in an electrochemical battery. The reticulated electrode structure may be formed using a methodology that may increase the reacting surface space. By increasing the surface space of the reticulated electrode structure, one may increase the capacity and efficiency of the electrochemical battery. By increasing the surface space of the reticulated electrode structure, one may reduce the weight and unusable metals of the electrochemical battery.

Figure 1:
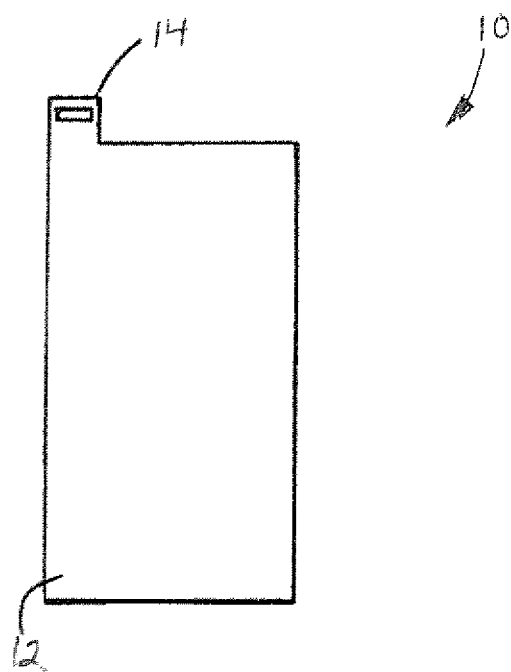
FIG. 1 is a front view of an electrode made in accordance with an embodiment of the present invention.
Figure 2:
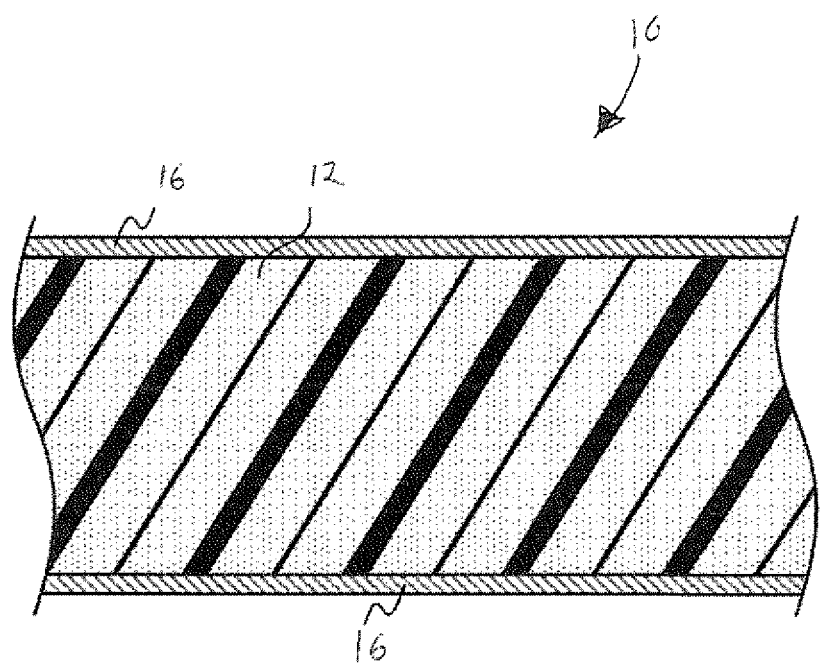
FIG. 2 is a cross-sectional view of the electrode of FIG. 1, made in accordance with an embodiment of the present invention.
Figure 3:
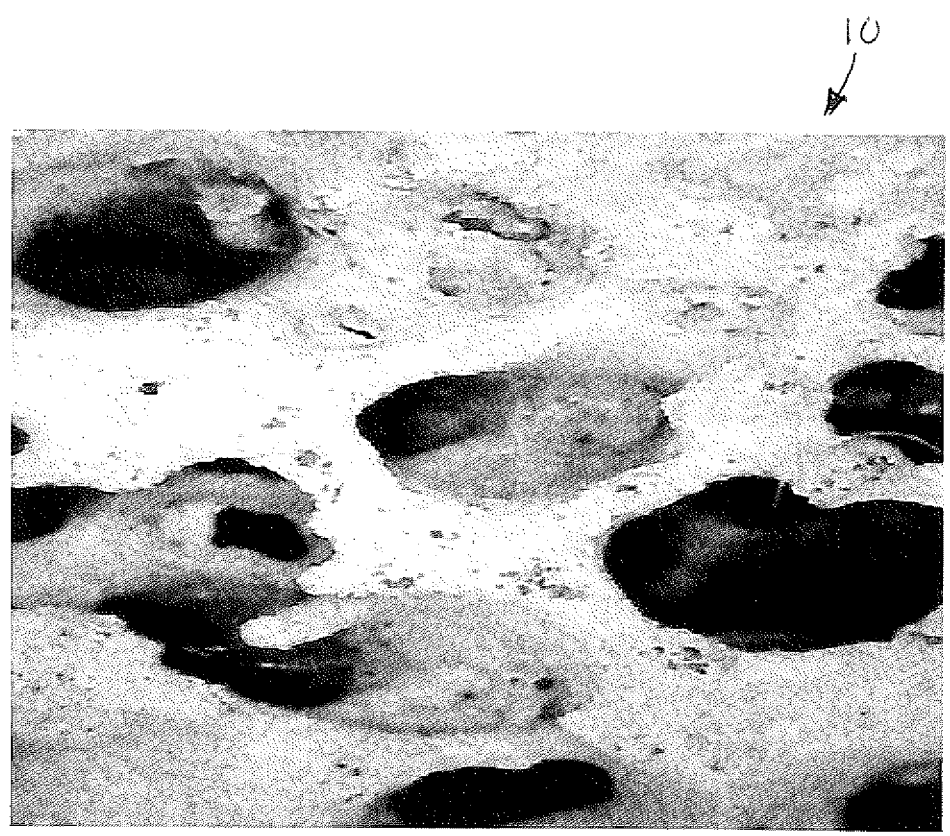
FIG. 3 is a magnified view of the electrode of FIG. 1, made in accordance with an embodiment of the present invention.

Referring to FIGS. 1-3, an electrode structure 10 according to one embodiment of the present invention may be seen. The electrode structure 10 may be used as one or more positive plates and/or one or more negative plates in an electrochemical battery. The electrode structure 10 may be formed of a non-conductive reticulated substrate 12.

In accordance with one embodiment, the non-conductive reticulated substrate 12 may be reticulated polymer foam. For example, polyurethane foam or similar foam may be used. The reticulated polymer foams may be open celled. Open cell reticulated polymer foam may have air pockets or tubes formed therein that are connected together. The air pockets or tubes coupled together allow a liquid substance to flow through the entire structure, displacing the air. Thus, the air pockets/tubes may increase the usable surface area for chemical reaction. Open cell reticulated polymer foams are generally light weight and flexibility. This may allow the electrode structure 10 to be lightweight and formed in a variety of shapes.

In accordance with one embodiment, the non-conductive reticulated substrate 12 may be formed of a reticulated ceramic material. Ceramic materials are generally inorganic, non-metallic materials from compounds of a metal and a non metal. Ceramic materials may be crystalline or partly crystalline. The crystalline or partly crystalline structure form microscopic honeycomb structures which may increase the usable surface area for chemical reaction. The rigidity and integrity of ceramic materials may allow the electrode structure 10 to be used in applications demanding high tensile strength of the electrode structure 10.

A connector 14 may be formed on the non-conductive reticulated substrate 12. The connector 14 may be used to couple the electrode structure 10 to a positive and/or negative connector of the electrochemical battery.

The non-conductive reticulated substrate 12 may be coasted with a conductive material 16. The non-conductive reticulated substrate 12 may be treated so that the surface area throughout the non-conductive reticulated substrate 12 may be uniformly coasted with the conductive material 16 as will be described below.

Referring to FIG. 4, one embodiment of a method 20 of treating the non-conductive reticulated substrate 12 for forming the electrode structure 10 may be disclosed. The method 20 may allow the non-conductive reticulated substrate 12 to be uniformly coated with the conductive material 16. The non-conductive reticulated substrate 12 may be immersed into an electrically conductive liquid as shown in Step 22 to uniformly coat the non-conductive reticulated substrate 12 with the conductive material 16. In accordance with one embodiment, immersion dipping is used since immersion dipping offers uniform and equilibrium distribution of the conductive materials 16 throughout the surface of the non-conductive reticulated substrate 12 when compared to vacuum plating or plasma deposition which may only deposit think coats of conductive metal on a bearing surface and were not able to penetrate deep into the core (interior) of the non-conductive reticulated substrate 12.

In accordance with one embodiment, an ultrasonic tank may be used in the immersion dipping process. In the ultrasonic tank, one or more transducer may produce ultrasonic waves which may be used to break down the surface tension at the boundary layer of the non-conductive reticulated substrate 12 as shown in Step 24. This may promote adhesion of the conductive material 16 applied during the immersion dipping process. In accordance with one embodiment, the one or more transducers may generate an ultrasonic frequency in the range of 28-48 kHz.

In accordance with one embodiment, the electrically conductive liquid may be a water-soluble conductive ink. In general, the water-soluble conductive ink is non-toxic. It can be diluted indefinitely to optimize the application process. By diluting the water-soluble conductive ink may be able to penetrate deep into the core (interior) of the non-conductive reticulated substrate 12.

The conductive material in the water-soluble conductive ink may be a conductive carbon material. Conductive carbons are generally chemically inert. In accordance with one embodiment, the conductive material may be a blend of graphene, graphite of micron and nano particulate sizes. The graphene may have a spectrum of 2-25 micron in linear dimensions.

Once the non-conductive reticulated substrate 12 has been immersion dipped and conductive material attached throughout the surface of the non-conductive reticulated substrate 12, the coated reticulated substrate may then be removed so that the conductive material attached may be cured as shown in Step 26. Different types of curing processes may be used to harden the conductive material attached to the reticulated substrate. Curing may be done through electron beams, heat, chemical additives, infrared heating, ultraviolet radiation as well as other methods. The above is given as examples and should not be seen in a limiting manner. Other types of curing processes may be used without departing from the spirit and scope of the invention.

Once the coated reticulated substrate has been cured, the coated reticulated substrate may be electro-plated as shown in Step 28. The coated reticulated substrate may be electro-plated with a user's choice of metal(s) to form the electrode 10. For example, silver, copper, gold, aluminum, zinc and the like may be used. The above is given as examples and should not be seen in a limiting manner.

In accordance with one embodiment, once the electrode 10 is formed, the non-conductive reticulated substrate 12 may be removed. In this embodiment, the non-conductive reticulated substrate 12 is generally a reticulated polymer foam. The reticulated polymer foam may be removed through a heating process to burn off the reticulated polymer foam. In accordance with one embodiment, the reticulated polymer foam may be removed through a process of controlled combustion.

The above method may allow for the economical mass production of battery electrodes. Further, the above method may allow metals to be grown on the non-conductive reticulated substrate to have crystalline structure with memory. This may be highly desirable for deep cycle batteries. Using the above method, a ceramic substrate can also be used to grow engineering ceramics, such as piezoelectric ceramic by plasma deposition. After the thin-film ceramic is grown on the substrate, conductive adhesive may be applied. Metals may be deposited onto the surface of the ceramic. This is the foundation of high-efficiency fuel cell.

Referring to FIG. 5, one embodiment of a method 30 of treating the non-conductive reticulated substrate 12 for forming the electrode structure 10 may be disclosed. In the method 30 the non-conductive substrate is provided as shown in Step 32. The non-conductive substrate may be reticulated polymer foam, reticulated ceramic, polymer wire/rod or the like. The above is given as an example and should not be seen in a limiting manner.

In Step 34, one may etch the surface of the non-conductive substrate. The chemicals used for etching the non-conductive substrate may vary based on the material of the non-conductive substrate. For example, if the non-conductive substrate is a polymer foam and/or polymer wire/rod, chemicals such as, but not limited to, NaOH or O3 may be used for etching. If the non-conductive substrate is a ceramic, a chemical such as, but not limited to, HF may be used for etching.

In Step 36, after the non-conductive substrate has been etched, the surface of the non-conductive substrate may be coated with a catalyst to aid in a deposition process. The catalyst may be a chemical such as but not limited to a palladium compound.

In Step 38, metals are deposited onto the treated non-conductive substrate. In accordance with one embodiment, metals may be deposited on the treated substrate using electroless deposition of metals. In electroless deposition, the treated substrate is placed in an aqueous solution where several simultaneous reactions may occur without the use of external electrical power.

The foregoing description is illustrative of particular embodiments of the application, but is not meant to be a limitation upon the practice thereof. The following claims, including all equivalents thereof, are intended to define the scope of the application.

What is claimed is:

1. A method of forming an electrode in an electrochemical battery comprising:
applying a conductive coating to a reticulated ceramic substrate, the reticulated ceramic substrate having a crystalline structure forming microscopic honeycomb structures having a plurality of interconnecting openings, wherein applying the conductive coating to the reticulated substrate comprises:
immersion dipping the reticulated ceramic substrate, wherein immersion dipping comprises immersing the reticulated substrate in an ultrasonic tank containing the conductive coating, wherein the conductive coating is a water-soluble conductive liquid; and
applying ultrasonic wave to break down a surface tension at the boundary layer of the reticulated ceramic substrate to allow the water-soluble conductive liquid to flow through the openings and permeate an interior of the honeycomb structures forming the reticulated ceramic substrate to increase a reactive surface area of the reticulated ceramic substrate and promote adhesion of the conductive material within the interior of the honeycomb structures forming the reticulated ceramic substrate; and
curing the reticulated ceramic substrate coated with the conductive material.

2. The method of claim 1, generating signals in the ultrasonic tank having an ultrasonic frequency in a range of 28-48 kHz.

3. The method of claim 1, wherein the conductive liquid is a water-soluble conductive ink having conductive carbon materials.

4. The method of claim 1, wherein the conductive liquid is a water-soluble conductive ink having conductive carbon materials, wherein the conductive carbon materials are a combination of graphene and graphite.

5. The method of claim 4, wherein the graphene is approximately 2-25 micron in linear dimensions.

6. A method of forming an electrode in an electrochemical battery comprising:
applying a conductive coating to a reticulated ceramic substrate having a honeycomb structure, wherein applying the conductive coating to the reticulated ceramic substrate comprises:
immersion dipping the reticulated ceramic substrate in an ultrasonic tank containing the conductive coating, wherein the conductive coating is a water-soluble conductive ink having conductive carbon materials; and
applying ultrasonic wave to break down a surface tension at the boundary layer of the reticulated ceramic substrate to allow the water-soluble conductive ink to flow through the honeycomb structure and permeate an interior of the reticulated ceramic substrate, the conductive carbon material adhering to the interior of the reticulated ceramic substrate to increase a reactive surface area of the reticulated ceramic substrate.

7. The method of claim 6, comprising curing the reticulated ceramic substrate coated with the conductive carbon materials.

* * * * *